(12) United States Patent
Eslambolchi et al.

(10) Patent No.: US 7,446,665 B1
(45) Date of Patent: Nov. 4, 2008

(54) METHOD FOR AUTOMATICALLY DETECTING AND ISOLATING A POWER OUTAGE IN A COMMUNICATION NETWORK

(75) Inventors: Hossein Eslambolchi, Los Altos, CA (US); John McCanuel, Bailey, CO (US); Paritosh Bajpay, Edison, NJ (US); Chen-Yui Yang, Marlboro, NJ (US)

(73) Assignee: AT&T Corp., New York, NY (US)

( * ) Notice: Subject to any disclaimer, the term of this patent is extended or adjusted under 35 U.S.C. 154(b) by 334 days.

(21) Appl. No.: 11/292,291

(22) Filed: Dec. 2, 2005

(51) Int. Cl.
*G08B 21/00* (2006.01)

(52) U.S. Cl. .................. 340/635; 340/502; 340/506; 340/507; 340/521; 340/531; 340/657; 340/870.02; 370/356; 370/401; 701/57

(58) Field of Classification Search .................. 340/635, 340/502, 506, 507, 514, 521, 531, 539.14, 340/657, 870.02, 870.03; 370/365, 401, 370/356; 702/57
See application file for complete search history.

(56) References Cited

U.S. PATENT DOCUMENTS 6,646,981 B1 * 11/2003 Kinouchi et al. ............ 370/216
6,963,285 B2 * 11/2005 Fischer et al. ............... 340/635

* cited by examiner

*Primary Examiner*—Hung T. Nguyen

(57) ABSTRACT

Systems and methods for detecting power outages in communication networks are described. In one implementation, an alarm associated with a network error is detected. Attempts are made to contact the network equipment originating the alarm. The alarm is linked to an error that is identified as either a power outage or another type of error depending on the results of the attempts to contact the network equipment originating the alarm.

8 Claims, 3 Drawing Sheets

METHOD FOR AUTOMATICALLY DETECTING AND ISOLATING A POWER OUTAGE IN A COMMUNICATION NETWORK

BACKGROUND

The present invention relates to communication network management. In particular, but not by way of limitation, the present invention relates to a system and method for error detection in a communication network.

Communication networks require quick and reliable error detection and isolation to ensure network integrity, and maintain both customer satisfaction and customer loyalty. In the competitive telecommunications industry it is advantageous to identify network troubles quickly and get them resolved as soon as possible.

Previously known T3 and T1 technology has limited automation for diagnosing errors in T3 and T1 network equipment, especially errors due to power outages. As an example, FIG. 1 shows a block diagram 100 of a previously known power outage detection and isolation system. System 100 consists of a customer premises equipment (CPE) 110, a channel service unit (CSU) 120, an alarm management platform 130, a test tool 140, a ticketing system 160, a maintenance platform 170, a work center 180 and a customer 190.

In this system, if the CPE 110 experiences a power outage the alarm management platform 150 detects an alarm 112 and alerts the ticketing system 160. The ticketing system 160 forwards a notification (not shown) of the alarm 112 to the work center 160. The work center 160 uses the test tool 140 to contact the CPE 110 or the CSU 120 in order to diagnose the alarm 112. The alarm 112 is identified as either a power outage or another type of error by the work center 160, and the customer 190 is contacted to confirm the identification.

A disadvantage of previously known systems like that described with respect to FIG. 1 is their reliance on the one or more technicians to properly and quickly identify an outage alarm. The use of technicians is prone to human error and the time required to diagnosis an out of service state is limited by technician response time.

Accordingly, current automated techniques for detecting and isolating errors in T1, T3, and other communication networks do not operate in a convenient, cost-effective manner and will most certainly not be satisfactory in the future. There is a need for real-time monitoring of the entire communication path from customer installation to customer installation that provides a proactive method for trouble detection and isolation in the communication network.

SUMMARY OF THE INVENTION

Embodiments of the present invention include methods for detecting and isolating errors in a communication network. In one embodiment the invention may be characterized as a method for automatically detecting a power outage in a communication network. The method includes detecting an existence of an error, identifying a device in the communication network that created the error, and determining whether the error is a power outage.

Exemplary embodiments of the present invention are more fully described in the Detailed Description section. It is to be understood, however, that there is no intention to limit the invention to the forms described in either this section or in the Detailed Description section of this application. One skilled in the art can recognize that there are numerous modifications, equivalents and alternative constructions that fall within the spirit and scope of the invention as expressed in the claims

BRIEF DESCRIPTION OF THE DRAWINGS

Various advantages and a more complete understanding of the present invention are apparent and more readily appreciated by reference to the following Detailed Description and to the appended claims when taken in conjunction with the accompanying Drawings wherein:

DETAILED DESCRIPTION

The present arrangement described below allows a service provider to detect and isolate troubles in a communication network. Although specific examples are developed using T1 and/or T3 network technologies, one of ordinary skill in the art will recognize that alternative network technologies are within the scope of the present invention.

Figure 1:
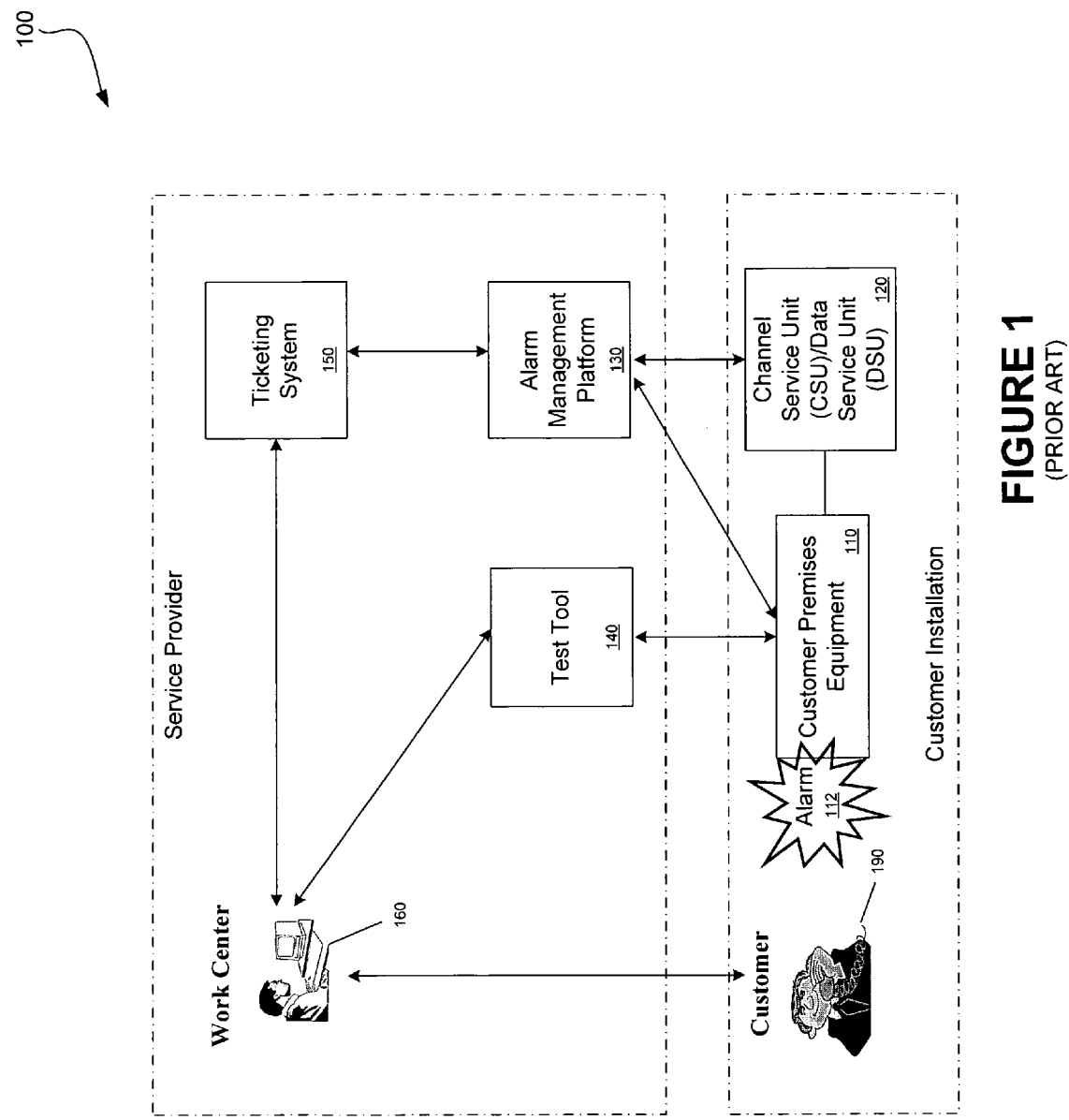
FIG. 1 illustrates a block diagram of an outage detection system known in the art.
Figure 2:
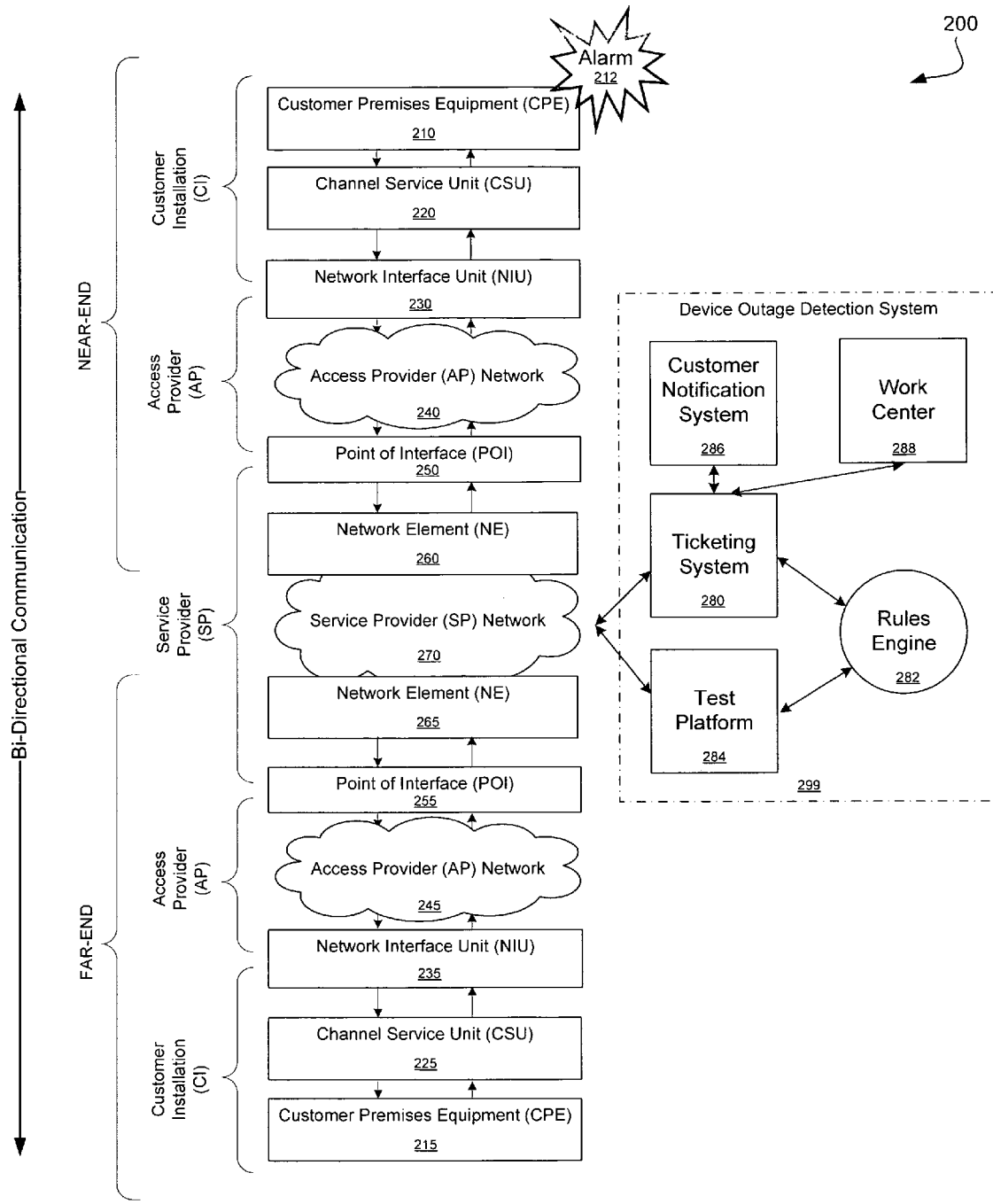
FIG. 2 illustrates a block diagram of a customer-to-customer communication network system in accordance with an exemplary embodiment of the present invention.

FIG. 2 is a communication network 200 in accordance with an exemplary embodiment of the present invention. The term "communication network" is used herein to refer to any type of communication network, including customer-to-customer communication networks, internal customer communication networks, internal service provider communication networks, internal access provider communication networks, customer-to-service provider communication networks, customer-to-access provider communication networks, and access provider-to-service provider communication networks, as well as variations of the listed communication networks recognizable in the art.

Attention is now directed to FIG. 2, which includes a near-end environment and a far-end environment. The terms "near-end" and "far-end" are used herein to distinguish between two opposite-ended environments of the network 200 that share similar network components. For example only, the near-end environment is comprised of network components that include a customer premises equipment (CPE) 210, a channel service unit (CSU) 220, a network interface unit (NIU) 230, an access provider (AP) network 240, a point of interface (POI) 250 and a network element (NE) 260. The far-end environment is comprised of network components that include a customer premises equipment (CPE) 215, a channel service unit (CSU) 225, a network interface unit (NIU) 235, an access provider (AP) network 245, a point of interface (POI) 255 and a network element (NE) 265. The network components listed above are linked directly or indirectly using bi-directional communication technology that allows data exchange to and from each component.

As shown in FIG. 2, the network 200 comprises sub-environments including a near-end customer installation (CI), and near-end access provider (AP), a service provider (SP), a far-end access provider (AP), and a far-end customer installation (CI). Each of these sub-environments are shown to include one or more of the network components listed above. Additionally, the service provider sub-environment includes a service provider network 270. In an exemplary embodiment, the service provider sub-environment includes a device outage detection system 299 which comprises a ticketing system 280, a rules engine 282, a test platform 284, a customer notification system 286 and a work center 288. One of ordinary skill in the art will recognize alternative embodiments that include the chronic error detection system 299 in environments other that the service provider sub-environment.

The access provider sub-environments provide a connection between the customer installation sub-environments and the service provider sub-environment. The service provider sub-environment provides a service to one or more customer installation environments. In one embodiment, the service is a telecommunications service, an Internet service, or a combination thereof. One of ordinary skill in the art will appreciate alternative services that are within both the scope and the spirit of the present invention. One of ordinary skill in the art will also appreciate alternative embodiments where the customer installation sub-environments and the service provider sub-environment connect directly to each other.

It should be recognized that the bi-direction communication technology of the network 200 is not limited to any particular type of communication technology. For convenience, however, embodiments of the present invention are generally described herein with relation to T1- and T3-based networks. One of ordinary skill in the art can easily adapt these implementations to other types of communication networks or communication systems.

Figure 3:
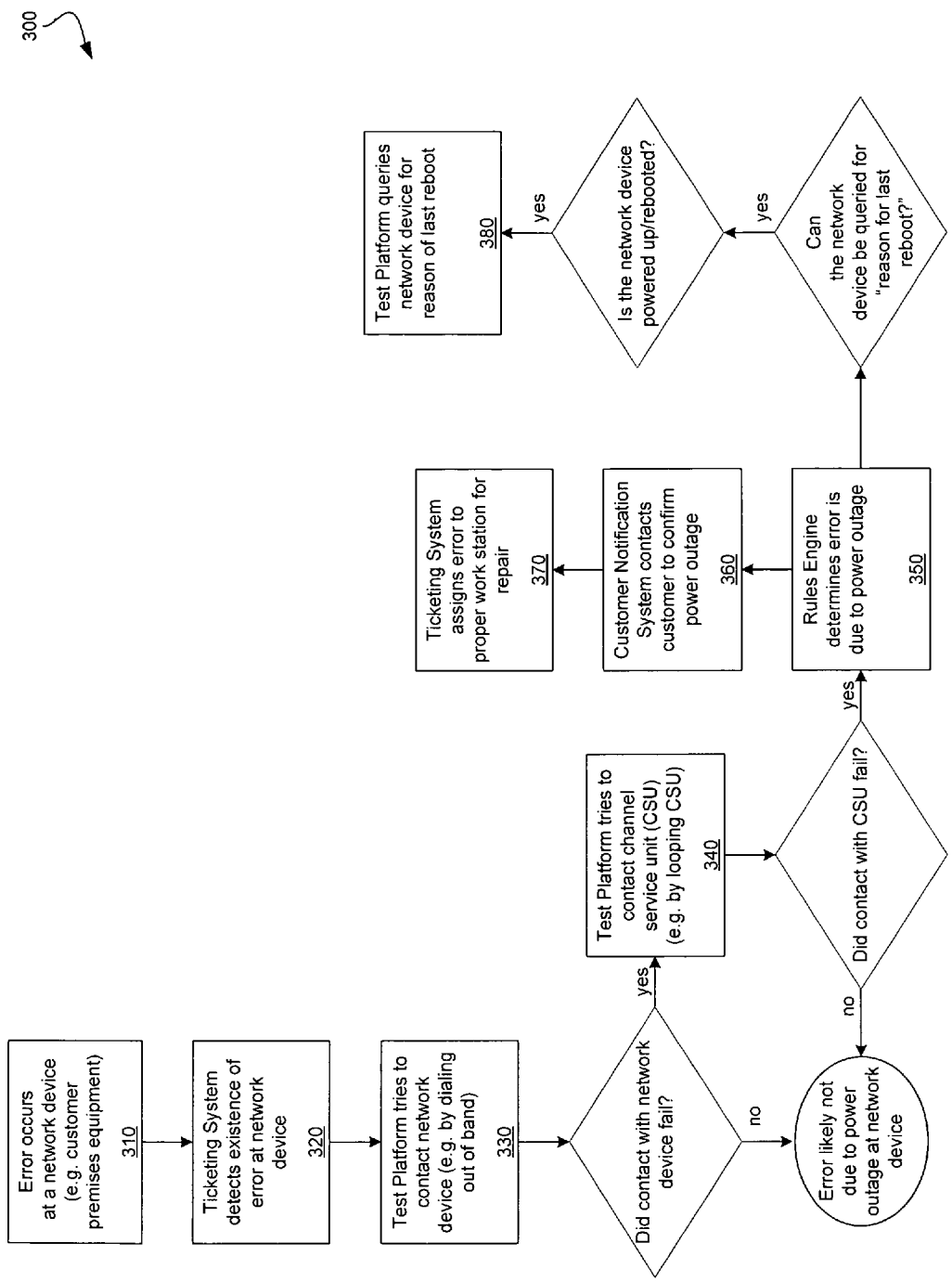
FIG. 3 depicts a process flow diagram representative of operation of the exemplary embodiment of the present invention.

While referring to FIG. 3, simultaneous reference will be made to FIG. 2. FIG. 3 depicts a process flow diagram 300 representative of operation of the exemplary embodiment of the present invention.

According to FIG. 3, if a network device (e.g. the CPE 210) experiences an error (Block 310), the device outage detection system 299 will detect the existence of the error (Block 320).

In one embodiment, the device outage detection system 299 detects the existence of an error when it is reported by one or more components in the system 200. For example, a customer associated with the customer premises equipment 210 may contact the device outage detection system 299 to report a service problem. Contact may be accomplished by any number of methods including, but not by way of limitation, calling the service provider, emailing the service provider, sending an embedded message to the service provider, or any other methods within both the scope and spirit of the present invention.

In another embodiment, the device outage detection system 299 detects when one or more errors occur in the system 200 by detecting signal abnormalities. The signal abnormalities may include service-affecting conditions that render all or a portion of a communication service inoperable, and performance-based conditions that inhibit the performance of a communication network. These conditions are generally measured by the standards of the American National Standards Institute. Alternatively, a service provider may set signal abnormality thresholds and determine that a power outage has occurred with reference to those thresholds.

Service-affecting conditions are common when a network component or a network circuit fails, powers down, or is out of service for other reasons. For example, the service-affecting conditions may include an alarm indication signal failure, a loss of frame failure, a loss of signal failure, a remote alarm indication failure and/or other alarm failures known in the art.

Performance-based conditions are common when there is poor signal quality or a loss of signal, and when a network component is dropping data (e.g. intermittent data packets). For example, the performance-based conditions may be indicated by performance management data such as performance report messages, network performance report messages, far end block error data, errored second data, severely errored seconds data, control source slips data, unavailable seconds data, bursty errored seconds data and/or other performance management data known in the art. In one embodiment, the performance monitoring data is measured against one or more predetermined threshold values to determine when an error exists in the system 200. If the performance monitoring data exceed the one or more predetermined threshold values, then a performance-based condition exists.

In an exemplary embodiment, if the device outage detection system 299 detects an abnormality in the signal (e.g. alarm 212), the ticketing system 280 will receive an indication of the existence of the alarm 212 and forward a message to the rules engine 282 indicating that the alarm 212 was detected. The rules engine 282 then begins an automated test to determine whether the alarm 212 is a result of a power outage.

To start, the rules engine 282 instructs the test platform 284 to contact the (e.g. the CPE 210) that originated the alarm 212 (Block 330). In an exemplary embodiment, the test platform 284 tries to contact the network device by dialing out of band. Dialing out of band (OOB) is a connectivity method that transmits signals without using any part of the transmission channel capacity reserved for subscriber traffic. Although the term "out of band" is normally used to describe transmissions utilizing a different frequency band than the speech signal, as is the case for older frequency division multiplexing device where different bands of frequencies are involved, it is also defined herein to include modern digital transmissions that use different digital bits than those reserved for the subscriber traffic.

If the test platform 184 connects with the CPE 210, then the rules engine 282 determines that the alarm 212 is not due to a power outage at the CPE 210. If the test platform 284 cannot connect with the CPE 210, then the test platform 284 tries to connect with the CSU 220 (Block 340). In an exemplary embodiment, the test platform 284 tries make a connection by looping the CSU 220. Data returned from the looping attempt will indicate whether the test platform 284 could connect with the CSU 220.

If a connection could not be made between the test platform 284 and the CPE 210, and if an attempt to establish contact between the test platform 284 and the CSU 220 associated with the alarm 212 fails, then the rules engine 282 determines that the alarm 212 is due to a power outage (Block 350).

An alternative step may be inserted if the test platform's 284 attempt to connect with the CSU 220 is unsuccessful. This steps provides that an attempt to loop the NIU 230 is performed by the test platform 284. In this alternative embodiment, if looping of the NIU 230 is successful, then the rules engine 282 determines that the error at the CPE 210 is due to a power outage (Block 550). If looping of the NIU 230 is unsuccessful, then the rules engine 282 performs additional diagnosis to identify the type error that triggered the alarm 212.

If the rules engine 282 determines that the alarm 212 is due to a power outage, the ticketing system 280 begins repair coordination. In one embodiment, the repair coordination consists of contacting the customer via the customer notification system 286 to confirm that the alarm 212 resulted from a power outage (Block 360). In another embodiment, the repair coordination consists of assigning the repair of the power outage to the work station 288 (Block 370). The work station 288 may comprise one or more technicians or may be fully automated. After receiving the assignment from the ticketing system 280, the work station 288 schedules maintenance of the CPE 210, resets/repairs the CPE 210, instructs the customer how to reset/repair the CPE 210, and/or assigns the repair to another work station.

In an exemplary embodiment, when the CPE 210 returns from its power outage to a powered up state, the rules engine 282 will determine whether the CPE 210 supports a "reason for last reboot" query. A "reason for last reboot" is an indication sent from the CPE 210 that provides information regarding the reason for the CPE's 210 last reboot. If the CPE 210 supports such a query, then the test platform 284 queries the CPE 210 to confirm the reason for the CPE 210's last reboot (Block 380). If it's last reboot is due to a power outage, the diagnosis for the cause of the alarm 212 completes.

Thus the rules engine and error isolation algorithm provide a method for efficiently determining whether a power outage has occurred that is disrupting customer service. The arrangement, relying on one or more programmed processors, and the rules based engines decreases the need to rely on technicians do process analyze, and respond to alarms.

In conclusion, the present invention provides, among other things, a system and methods for detecting and isolating errors in a communication network. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for automatically detecting one or more power outages in a communication network comprising:
    receiving an indication of an existence of an error in a network;
    identifying a device in the communication network as a potential source of the error using said received indication and a rules based engine applying a plurality of tests concerning the identified device; and
    using test results and said rules based engine to determine whether the error is a power outage.

2. The method of claim 1, further comprising:
    wherein one test of said plurality of tests includes:
    attempting to contact the device; and
    determining, if the attempting to contact the device is unsuccessful, that the error is a power outage.

3. The method of claim 1, further comprising:
    wherein said plurality of tests includes:
    attempting to contact the device; and
    attempting to contact an interface element that is connected to the device; and
    determining, if the attempting to contact the device is unsuccessful and if the attempting to contact an interface element is unsuccessful, that the error is the power outage.

4. The method of claim 3, wherein the attempting to contact the device comprises attempting to dial out of band to the device.

5. The method of claim 3 wherein the attempting to contact an interface element comprises attempting to loop the interface element.

6. The method of claim 3 wherein the device is a router.

7. The method of claim 3 wherein the interface element is a channel service unit.

8. A method comprising:
    receiving an indication of a communication failure;
    associating the communication failure with a device in a communication network;
    applying a first test to determine accessibility to said device;
    applying a second test to determine accessibility to a second network device that is associated with said device; and
    applying rules from a rules based engine to results of said first test and said second test to determine whether said communication failure is related to a power outage.

* * * * *